US006356657B1

United States Patent
Takaoka et al.

(10) Patent No.: US 6,356,657 B1
(45) Date of Patent: *Mar. 12, 2002

(54) IMAGE PROCESSING METHOD AND APPARATUS FOR DISCRIMINATING AN INPUT IMAGE AREA OR AN ATTRIBUTE OF IMAGE INFORMATION IN THE DISCRIMINATED AREA

(75) Inventors: Makoto Takaoka, Yokohama; Shugoro Ueno, Tokyo; Tetsuomi Tanaka, Kawasaki; Shigeo Fukuoka, Machida, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/493,614

(22) Filed: Jun. 22, 1995

(30) Foreign Application Priority Data

Jun. 23, 1994 (JP) .............................. 6-164644
May 15, 1995 (JP) .............................. 7-115705

(51) Int. Cl.⁷ .............................. G06K 9/48; G06K 9/30
(52) U.S. Cl. .................... 382/197; 382/316; 382/173
(58) Field of Search ................. 382/197, 190, 382/173, 180, 199, 242, 198, 200, 316

(56) References Cited

U.S. PATENT DOCUMENTS

| 4,961,231 | A | * | 10/1990 | Nakayama et al. ......... 382/197 |
| 5,050,222 | A | * | 9/1991 | Lee ............................. 382/176 |
| 5,111,514 | A | * | 5/1992 | Ohta ........................... 382/173 |
| 5,222,158 | A | * | 6/1993 | Takasaki et al. ............. 382/284 |
| 5,233,670 | A | * | 8/1993 | Dufour et al. .............. 382/199 |
| 5,446,803 | A | * | 8/1995 | Kumitake et al. .......... 382/290 |
| 5,448,692 | A | * | 9/1995 | Ohta ........................... 395/147 |
| 5,553,196 | A | * | 9/1996 | Takatori et al. .............. 706/31 |

FOREIGN PATENT DOCUMENTS

EP            0216158       *    4/1987

OTHER PUBLICATIONS

Baxes. *Digital Image Processing: Principles and Applications,* John Wiley & Sons, Inc., pp. 162–164, Jan. 1994.*

* cited by examiner

Primary Examiner—Jon Chang
(74) Attorney, Agent, or Firm—Fitzpatrick, Cella, Harper & Scinto

(57) ABSTRACT

An image block is detected by raster scanning an input image and chasing surrounding black pixels around a detected black pixel as the start point in sequence. Further, by judging the feature of the detected image block, the attribute of the image block can be judged. Also, by comparing the detected image block with a predetermined window, it is possible to determine whether or not the image block is noise, whereby image processing of higher accuracy can be effected.

45 Claims, 11 Drawing Sheets

```
struct block_rect{
            int parent;
            int child;
            }
```

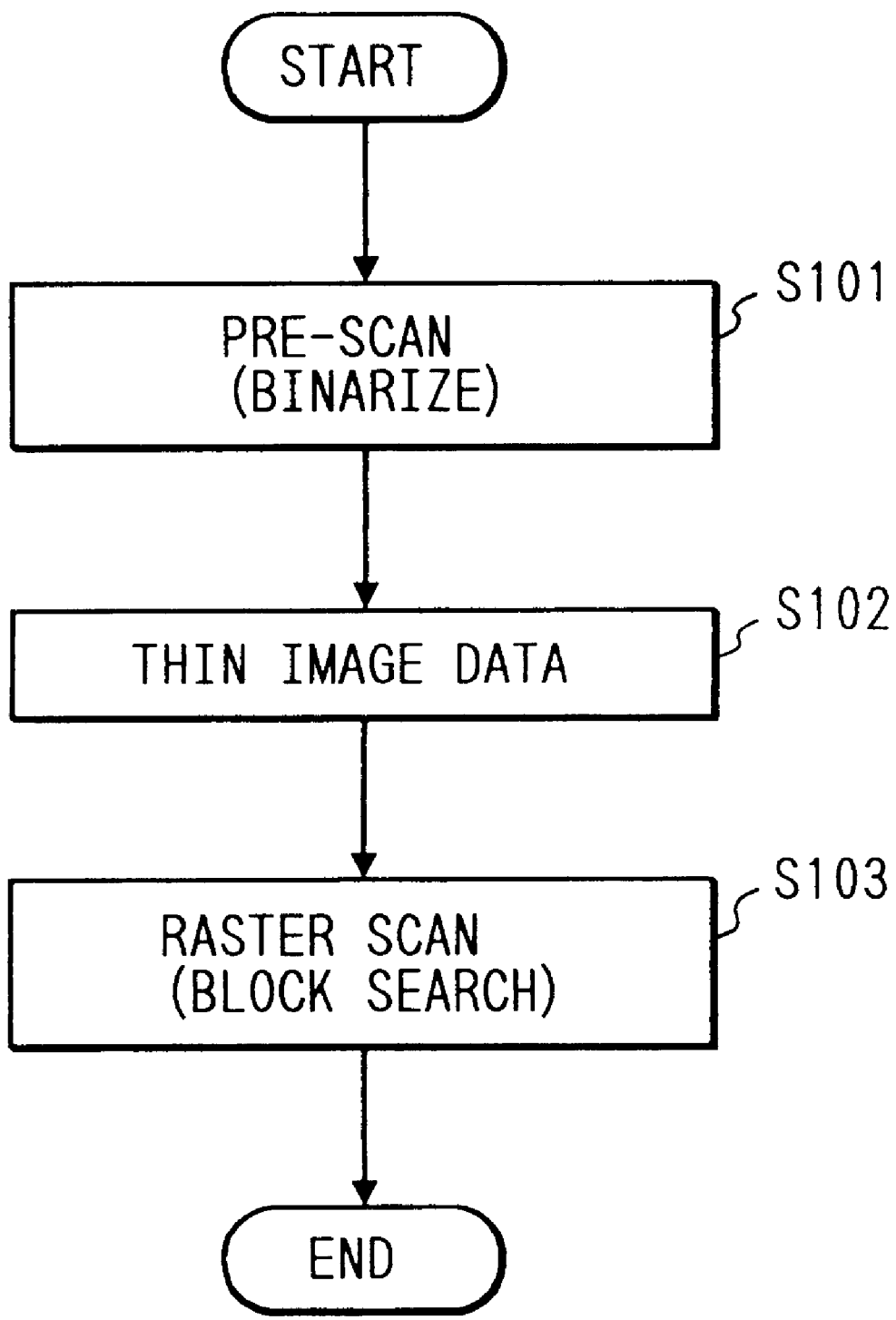

- -→ RASTER SCAN
- ● BLACK PIXEL CONFIRMED
- ○ WHITE PIXEL CONFIRMED
- ◉ PIXEL NOT SEARCHED

- -→ RASTER SCAN
- ● BLACK PIXEL CONFIRMED
- ○ WHITE PIXEL CONFIRMED
- ◉ PIXEL NOT SEARCHED

- → RASTER SCAN
- ● BLACK PIXEL CONFIRMED
- ○ WHITE PIXEL CONFIRMED
- ◉ PIXEL NOT SEARCHED

IMAGE PROCESSING METHOD AND APPARATUS FOR DISCRIMINATING AN INPUT IMAGE AREA OR AN ATTRIBUTE OF IMAGE INFORMATION IN THE DISCRIMINATED AREA

BACKGROUND OF THE INVENTION

1. Field of the Invention

The present invention relates to an image processing method and apparatus, and more particularly to an image processing method and apparatus for discriminating the input image area or the attribute of image information in the discriminated area.

2. Related Background Art

In conventional image processing apparatuses, the image in an original having a plurality of different attributes such as text, graphic or icon mixed, or an original having only one attribute but divisible into a plurality of areas was processed to designate the area or the attribute of image information in the discriminated area from the image of each original, which was allowed only in terms of the specifications in some way from the user's hand.

This specification by the user's hand may include:
1) Setting an original on the image reader such as a scanner,
2) Issuing an instruction to read the image of its original from the host computer connected to the image processor,
3) Prescanning the image upon its instruction to display temporarily the input image on the display screen of the host computer,
4) Inputting the information of the area of image attributes for the image displayed temporarily, using a mouse or keyboard by the user's hand, and
5) Scanning the original in accordance with the area information or the attribute information which has been input to store the input image data.

Still further, the image data incorporated may be subjected to character recognition processing or image compression processing which is a processing suitable for the attribute designated in each area.

However, with the above conventional method, for a variety of sorts of originals which could be input, the designation of the area, or the attributes, by the user's hand was required every time the original image was processed, so that the user's burden was enormous, which made it difficult to process a large amount of original image.

Also, conventionally, a simple area discriminating method with longitudinal and transversal oblique shadow (histogram analysis) was employed as the image area separation technique of automatically discriminating the character (text) area or the image area from input image data without intervention of the user's hand.

However, with this method, the discrimination accuracy was lower, depending on the original condition, owing to the difficulty of discrimination between the character area with relatively more white pixels and the image area.

Also, conventionally, in discriminating the area or attribute of the image, the discrimination accuracy was sometimes degraded due to the noise contained in the input image data.

SUMMARY OF THE INVENTION

According to the present invention, each area surrounded by feature pixels within the image data read by predetermined reading means is chased one pixel after another to extract the feature of the area, whereby an intelligent function is added to an image reading process of an image recognition device to extend significantly its utilization form and relieve the human's burden, thereby achieving an improved recognition rate of image data.

According to the present invention, at the time when the feature pixel is detected on the basis of a raster scan method which starts from one end of the image data, the contour of an area to which the feature pixels belong is chased to extract the feature of the area, whereby all the feature pixel blocks in the image data can be detected by repeatedly performing the raster scan in such a way as to chase the contour from the start point of the first detected feature pixel among a feature pixel block to be detected and back to the start point again, thereby providing the information for the accurate area discrimination.

According to the present invention, the contour of an area surrounded by background pixels within the area surrounded by feature pixels is further chased, and the chasing of the contour of the area surrounded by feature pixels and the chasing of the contour of the area surrounded by background pixels are alternately repeated, whereby the contour of e.g., a character in the table can be detected.

According to the present invention, the chasing of the contour is sequentially performed, starting from an adjacent pixel lying in the synthesized direction of the direction opposite to a scan direction of short period with the raster scan method and a scan direction of long period with the raster scan method, in a direction toward an adjacent pixel in said scan direction of long period, or starting from an adjacent pixel in said scan direction of short period with the raster scan method, in a direction toward an adjacent pixel in the synthesized direction of said scan direction of long period with the raster scan method and said scan direction of short period, whereby the detection of feature pixels around a noticed pixel is given the order of priority, and if a higher priority pixel is detected, the raster scan immediately moves to its position to detect a feature pixel block with a minimum amount of investigation as required, so that the detecting process can be speeded up.

According to the present invention, even with the noise contained in the input image, the noise can be removed at high accuracy, so that the subsequent image processing can be effected at high accuracy without being affected by the noise.

BRIEF DESCRIPTION OF THE DRAWINGS

FIG. 6 is a flowchart showing the overall processing of an example 1.

DETAILED DESCRIPTION OF THE PREFERRED EMBODIMENTS (Embodiment 1)

The preferred embodiments of the present invention will be described below in detail with reference to the drawings.

Figure 1:
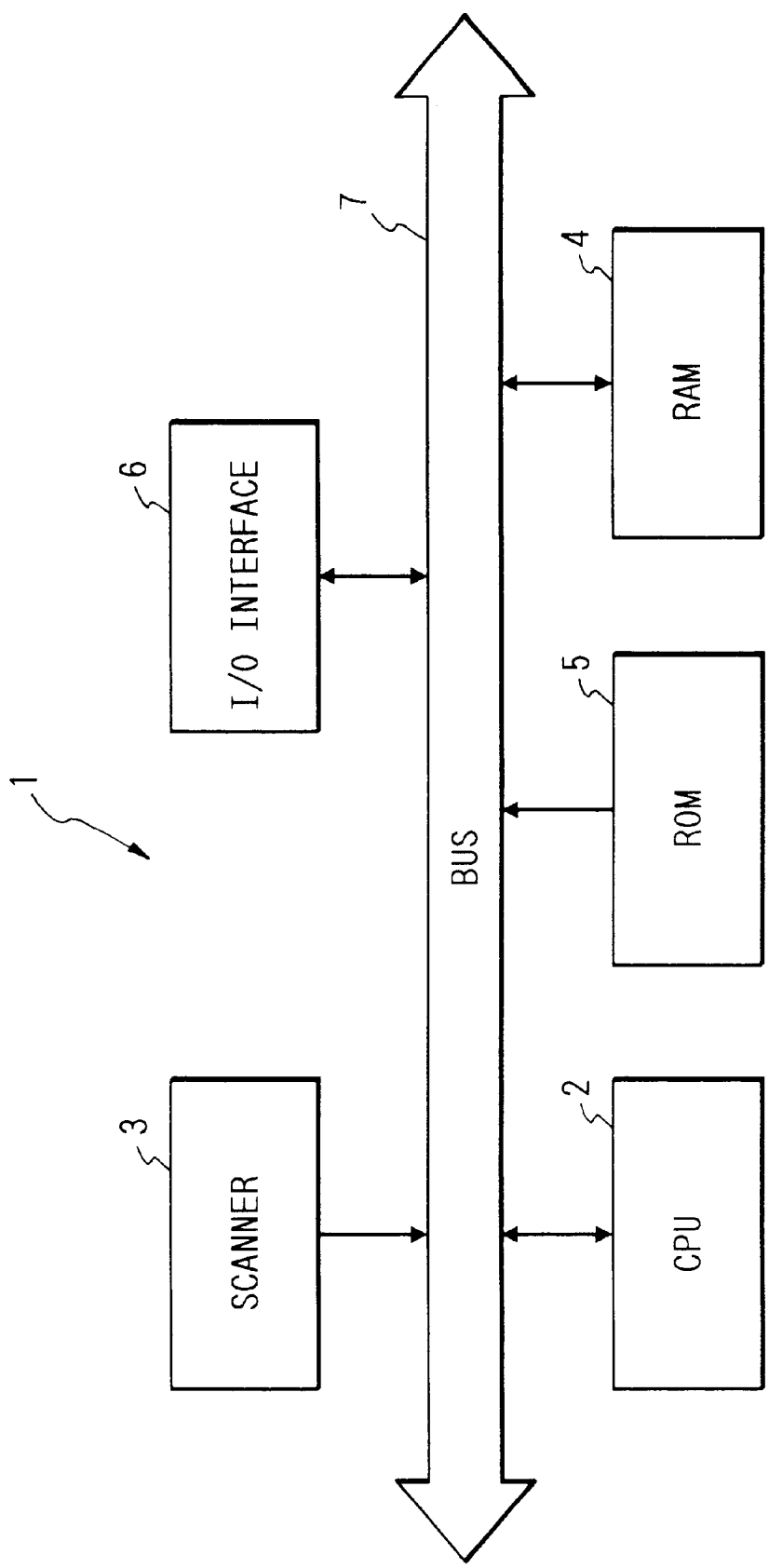
FIG. 1 is a block diagram showing the configuration of an image processor in an example of the present invention.

FIG. 1 is a block diagram showing the schematic configuration of an image processor according to one embodiment of the present invention.

In the same figure, an image processor 1 of this example is comprised of a CPU 2 governing the control of the whole processor 1, a scanner 3 for reading the information such as character, icon or graphic (line drawing) described on the original to be converted into image data, a RAM 4 for temporarily storing its image data or various processed results, a ROM 5 for storing the control processing program which the CPU 2 executes or the table data, and an input/output interface 6 for sending or receiving various kinds of data to or from the host computer externally provided. And the components 2 to 6 are interconnected via a bus 7.

Figure 2A:
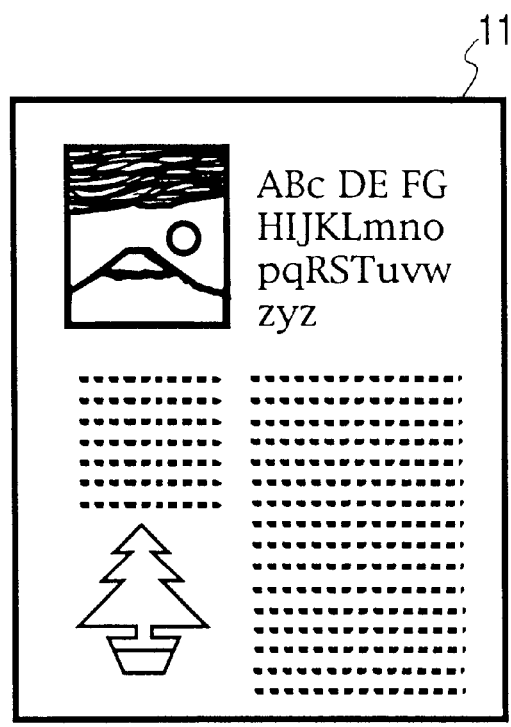
FIGS. 2A and 2B are views showing an example of an original composed of a plurality of attributes and a sequence of chasing the contour of the character.
Figure 2B:
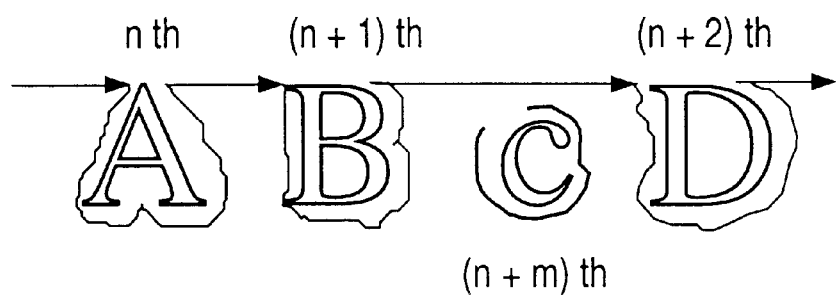

FIG. 2A illustrates an original on which the character, icon, and graphic (line drawing) are printed, and FIG. 2B shows the sequence of reading the information printed on the original. That is, an original 11 in FIG. 2A is converted into image data by the scanner 3.

Figure 7:
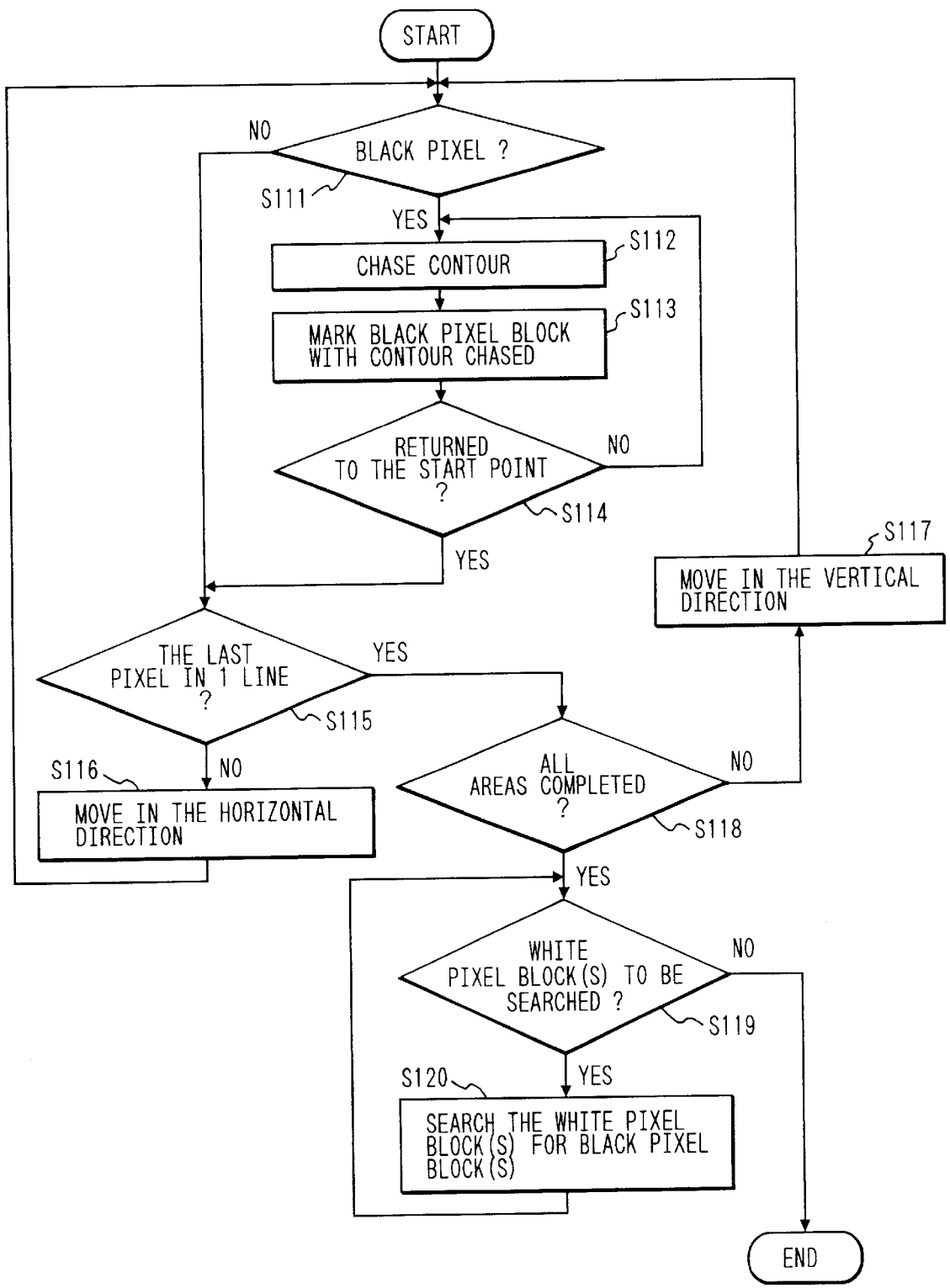
FIG. 7 is a flowchart of a block searching process.

The process in this example will be now described with reference to the flowcharts of FIGS. 6 and 7.

First, when the original is read by the scanner 3, the preprocessing such as pre-scan (binarization) is performed (S101). This pre-scan does not necessarily occur on the image data including the half-tone, but rather is desired to exhibit the feature of the image. This binarization may be strictly any one of a variety of methods, but this example employs a method of obtaining simple binary data by the comparison between individual image data and a fixed threshold.

Next, an area discriminating process is performed, and as its pre-processing, the image data is thinned (S102). This thinning process is performed in accordance with the resolution of image data, but because in view of the performance of the scanner 3 lately available, high density image data can be obtained, it is effective in the respects of the processing time and the saving of memory capacity to perform the thinning process to reduce the resolution before the area discriminating process. There are a variety of methods for this thinning process. For example, a method in which a window of n×m (pixels) is provided and if at least one black pixel exists in it, its block is judged to be black, and a method in which the replacement between black and white is judged according to the connecting condition of black pixels existing in a window of n×m (pixels). In doing so, the replacement of one pixel with one address is conducted to be more convenient for the subsequent processing. It is noted that this example uses the black pixel as the pixel (feature pixel) representing the feature section within the image data, but is not limited thereto, and may use other representing methods as far as they can represent the feature section.

In this manner, the pre-processing of the area discriminating process is ended, and then the image data after thinning (hereinafter referred to as "image data") is raster scanned from the left or right upper side of its image data in the horizontal direction (scanning direction of short period) (S103) to detect the black pixel (S116, S111). At this time, the raster moves down one line sequentially until the black pixel is detected. From the first detected black pixel as the starting point, the contour is chased (S112). If the black pixel is not detected on the line raster scanned, the raster moves down one line in the vertical direction (scan direction of long period) to repeat the above-mentioned scan (S117).

As above described, FIG. 2B shows how to chase the contour, and as can be seen from the figure, if the chasing of the contour is continued, the raster scan is finally returned to the start point again (S114), whereupon the raster further moves down one line from the line having the start point thereon to detect the next black pixel. That is, the contour is chased in a sequence of "A", "B", "D", . . . "c". Herein, the black pixel block with the contour once chased is marked (S113) to notify that block has been already chased for the contour if that block is again detected on the subsequent line. In this way, the contour for all the areas in the image data is chased (S118).

If the detection of black pixel block over one plane is ended, the white pixel (background pixel) block within its black pixel block is searched (S119), and further the black pixel block within the white pixel block is searched (S120), this processing being repeated until no block is detected inside (S119). And this search is sequentially repeated for all the black pixel blocks first detected. Thereby, the information within the black pixel block is also detected, for example, the character in the table is detected. It is noted that when the white pixel block within the black pixel block is searched, and when no block is detected inside, the ratio of black pixel amount to white pixel amount is calculated to provide the feature information.

Figures 3A, 3B:
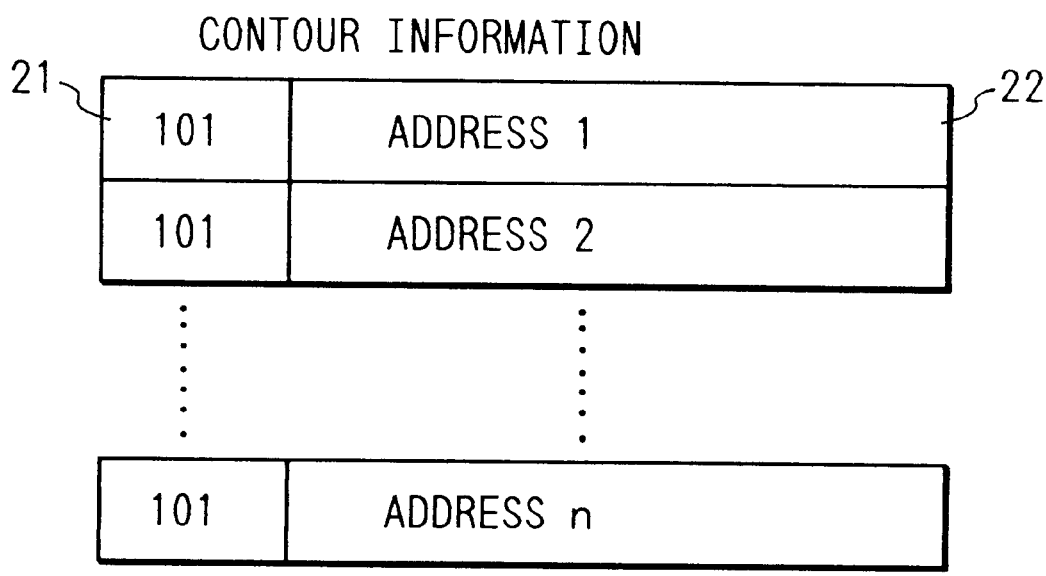
FIGS. 3A and 3B show the structure of a contour data table.

FIG. 3A shows an example of a contour data table storing the contour information, and FIG. 3B shows an example of the structure (struct) on which its contour data table is arranged as the information.

As shown in FIG. 3A, the contour information constituting the contour data table is composed of an area 21 storing the serial number of black pixel block, and an area 22 storing the address of black pixel detected in its black pixel block, the contour data table being composed of the contour information corresponding to the black pixel searched by chasing the contour of black pixel block as above described. Such table is arranged as the information in a structure as shown in FIG. 3B and stored in the RAM 4. This structure has the linking relation between the black pixel block indicated by this structure and the internal black pixel block, and in this example, the relation between parent (black pixel block indicated by this structure) and child (internal black pixel block). That is, when the noticed black pixel block contains a black pixel block, the child in the structure of the contour data table corresponding to the noticed black pixel block stores the serial number of the block contained, and when the contained block further contains a black pixel block, the child in the structure of the contour data table corresponding to the contained block stores the serial number of the black pixel block further contained, whereby the tracking of block is allowed from the block contained in a certain black pixel block to the further contained block, so that the correspondence relation of each contour table data can be immediately known.

Figure 4A:
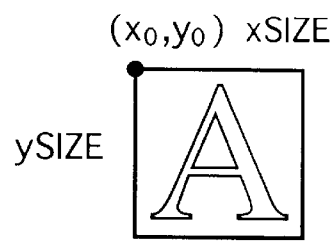
FIGS. 4A to 4C are views showing three examples of the rectangle separated from the image data.
Figure 4B:
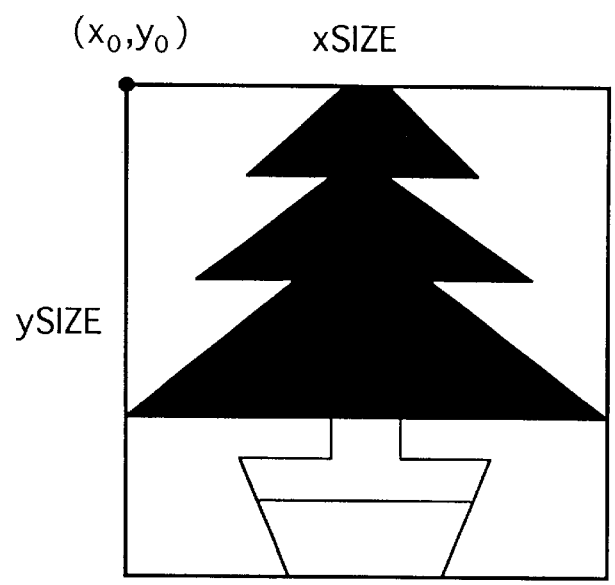
Figure 4C:
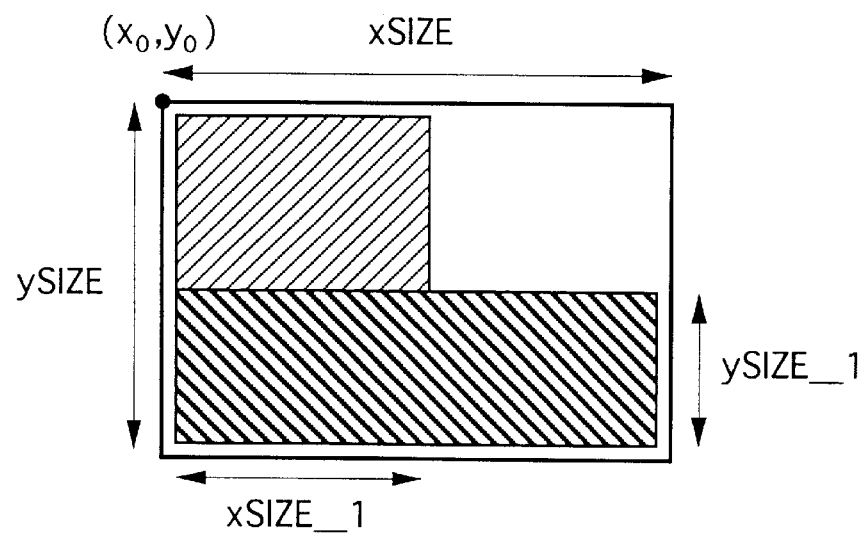

FIGS. 4A to 4C show an example of rectangle separated from the image data, based on the contour information of FIGS. 3A and 3B, wherein FIG. 4A shows a rectangle containing a character "A", FIG. 4B shows a rectangle containing the line drawing created by desk top publishing (DTP), and FIG. 4C shows a rectangle containing the graphic having a depression.

From the rectangle of FIG. 4A, the start position ($x_0$, $y_0$), width (xsize) and height (ysize) are calculated, this calculated information and the image data ("A") are sent to a character recognition processor, not shown, to recognize this image data, so that the character code corresponding to the character "A" can be obtained.

Likewise, from the rectangle of FIG. 4B, the start position ($x_0$, $y_0$), width (xsize) and height (ysize) are calculated, this calculated information and the image data (line drawing) are sent to a graphic recognition processor, not shown, to recognize this image data, so that the graphic recognition processing can be accomplished, and when the image data is simply compressed, the information is effectively usable.

FIG. 4C shows an example in which the information such as a depression in the graphic can be detected.

When the image data is a natural image, for example, quite irregular contour information can be obtained through the chasing process for the contour of black pixels to be raster scanned, in which case the rectangle can be judged to be the natural image by obtaining the density of black pixel of the rectangle separated from the image data based on the contour information.

Further, as regards the character block, the subsequent processing involving character string block, title, English, Japanese, vertical writing or horizontal writing is required to perform in accordance with the rectangle information of one character and the condition of a surrounding black pixel block thereof, but the detail description is not given herein because its processing is not characteristic to the present invention.

As above described, the searched contour information, the rectangular area information and the attribute information can be output via the input/output interface 6, singly or in combination with image data, by display means (CRT or LCD) or printing means.

Next, the searching process for the contour information which the CPU 2 of the image processor 1 with above configuration executes will be described below.

FIGS. 5A to 5I are views for explaining a procedure of investigating surrounding black pixels after the black pixel has been detected, wherein "○" indicates a pixel in each of FIGS. 5A to 5I.

Figure 5A:
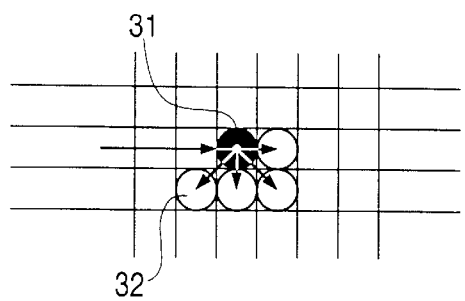
FIGS. 5A to 5I are views for explaining the positional relation of a detected black pixel and surrounding pixels being investigated from that pixel.
Figure 5B:
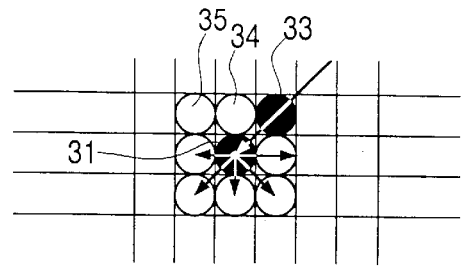
Figure 5C:
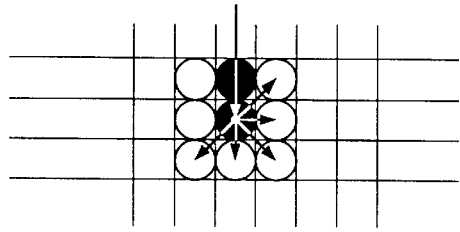
Figure 5D:
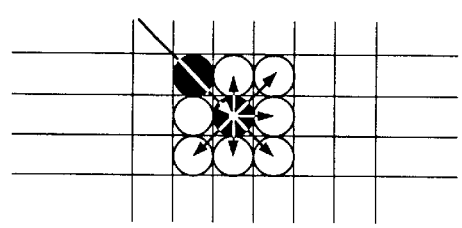
Figure 5E:
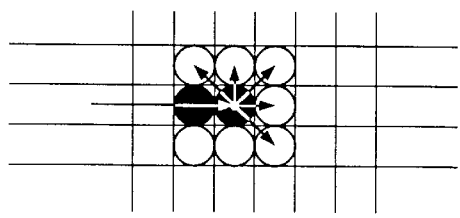
Figure 5F:
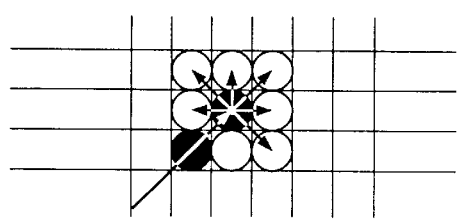
Figure 5G:
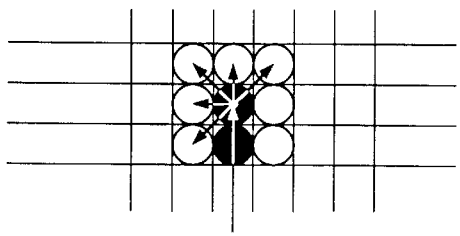
Figure 5H:
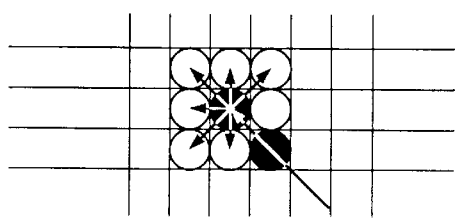
Figure 5I:
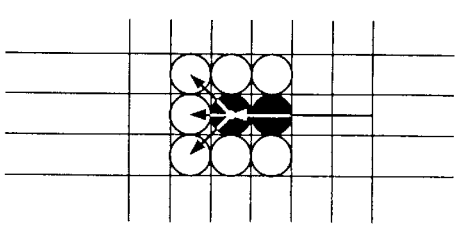

As shown in FIG. 5A, if a black pixel 31 is detected during raster scan of one line in image data from left to right, the search position is shifted diagonally to the lower left (in a south-west direction when the upper side is supposed the north) to a pixel 32 to determine whether the pixel 32 is black or not. Then, if the black pixel is detected, the raster scan occurs at that pixel position, and surrounding pixels are searched again. On the other hand, if no black pixel is detected, pixels are sequentially searched around the black pixel lastly detected in a counterclockwise direction. In this manner, the contour of black pixel block can be chased in the counterclockwise direction by investigating preferentially from the pixel located diagonally to the lower left of the noticed pixel. It is noted that since it is unnecessary to investigate the pixel at the location which has been already investigated by the previous pixel, depending on the shift direction, the investigation of that pixel can be omitted. For example, in FIG. 5B, the pixel 33 is a previous pixel, and the pixels 34 and 35 have been already investigated, and thus are not necessary to investigate when the next pixel around the pixel 31 is chased. The same FIGS. 5C to 5I are likewise considered.

As above described, according to the present invention, the black pixel block representing the feature necessarily becomes a closed system wherein the raster returns to the top first detected, so that the contour of black pixel block can be chased.

While this invention has been described with the example of the raster scan where the scan direction of short period is from left to right side in the horizontal direction, or the scan direction of long period is from upper to lower side in the vertical direction, but is not limited thereto, it will be appreciated that the raster scan may be configured such that the scan direction of short period is from right to left side in the horizontal direction, and the scan direction of long period is from upper to lower side in the vertical direction, so that the same effects can be obtained owing to their symmetry without difference. Further, this is also the case with the raster scan method having the above directions rotated by 90°.

Also, in this embodiment, the preferential detection order for detecting the black pixel occurs in a counterclockwise direction in chasing the contour for all the black pixel blocks (or clockwise direction if scanning from the right side), as shown in FIGS. 5A to 5I, so that when surrounding black pixels are detected from the start point which is the first detected black pixel, the pixel right adjacent (in the east direction) to the noticed pixel of FIG. 5A is examined, or if the preferential detection order is made clockwise, the black pixel block is subjected to the contour chasing clockwise. And the investigation for the pixel position necessary to be next examined occurs in the preferential order exactly opposite to that of this example, whereby the contour can be chased in the clockwise direction. Thereby, the exactly same effects as in this example can be obtained.

(Embodiment 2)

An image processor of another embodiment according to the present invention will be described below in detail with reference to the drawings. The configuration of the image processor of this example is the same as shown in FIG. 1, and herein not described any more.

This embodiment uses a contour chasing method for detecting the surrounding of a black or similar pixel in the original to discriminate the area of the image read through the image scanner.

This is as follows:

(1) The read multi-value (gradation) image is converted into binary image of black and white by binarization (e.g., simple binarization) suitable for the discrimination of area.

(2) The image size is reduced by thinning the pixels of binary image.

(3) The raster scan is performed to detect the black pixel, and to extract the black pixel block therefrom through the contour chasing.

(4) For a considerably large block, its inside is also searched.

(5) All the blocks extracted are combined with surrounding blocks to discriminate the attributes such as the character, graphic or icon.

When the image area is discriminated through such contour chasing, a number of blocks are produced due to the noise if the noise is contained in the image data, the blocks due to the noise may be combined with adjoining blocks having similar feature, thereby resulting in decreased accuracy of the area discrimination. This example prevents this decreased accuracy from arising by a method as will be described later.

Figure 8:
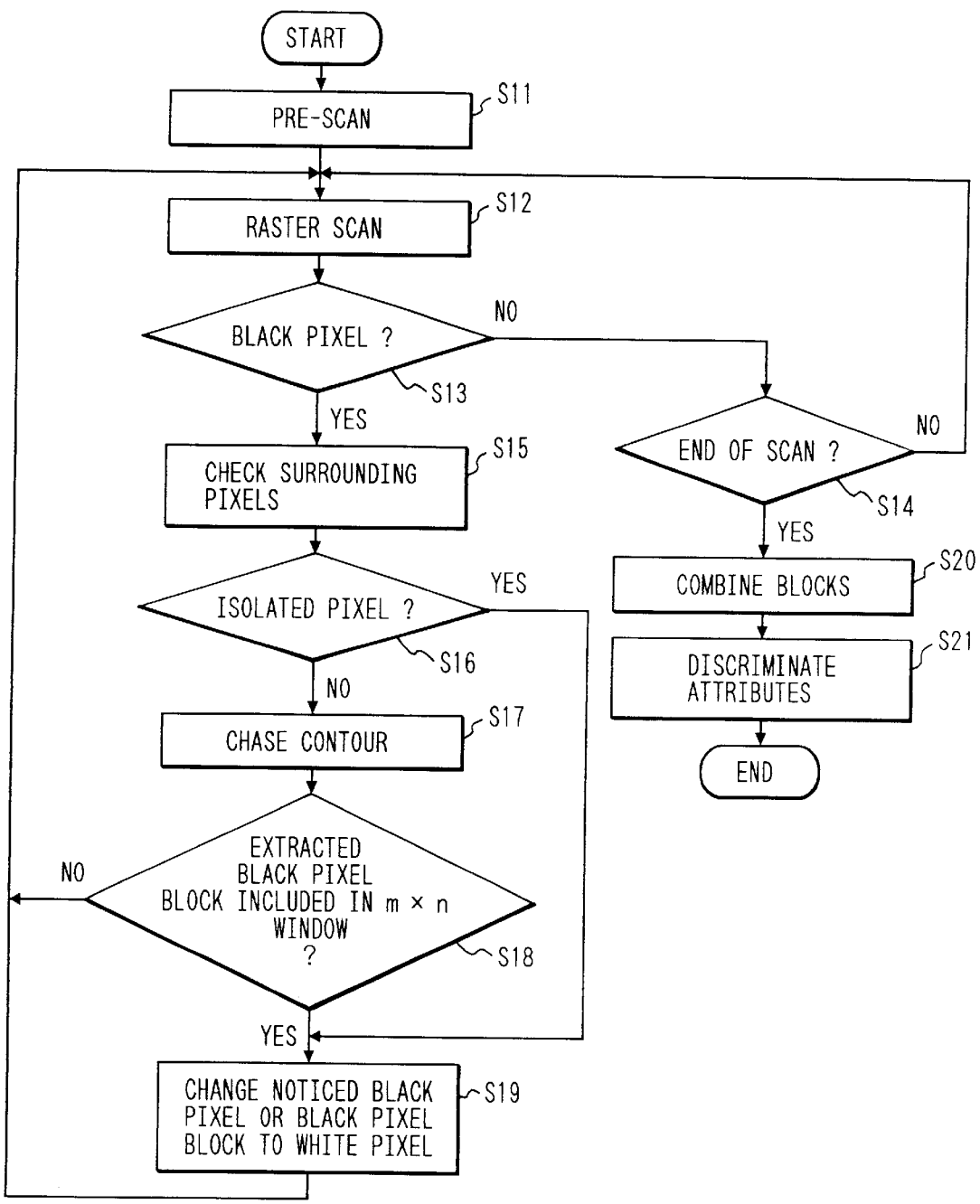
FIG. 8 is a flowchart exemplifying an area discriminating procedure of an example 2 according to the present invention.

FIG. 8 is a flowchart exemplifying an area discriminating procedure in this example, which is executed in accordance with a control program stored in the ROM 5 under the control of the CPU 2.

In the same figure, at step S11, the pre-processing of converting image data read from the scanner 3 into the form suitable for area discrimination (e.g., binary image) is performed. At step S12, the raster scan is started from the left upside of the image. And at step S13, the pixel is checked to be a black pixel or not. If not the black pixel, a determination is made whether or not the entire image has been scanned at step S14, and if not completed, the procedure returns to step S12. That is, the steps from S12 to S13 to S14 to S12 are repeated until the black pixel is detected, and if the black pixel is detected, the procedure goes to step S15.

Figure 9:
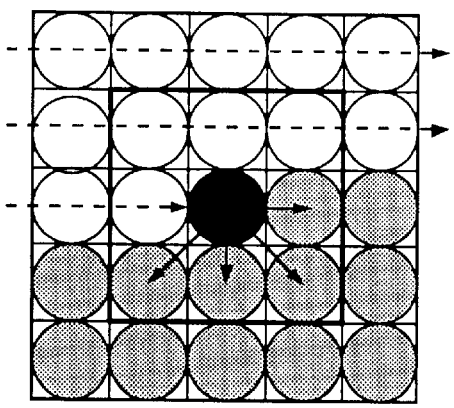
FIG. 9 is a view showing a method of determining whether or not the pixel is isolated.

At step S15, eight pixels (hereinafter referred to as "surrounding pixel") adjacent the detected black pixel (hereinafter referred to as "noticed pixel") are checked as to the black pixel. At step S16, a check is made to establish whether the noticed black pixel is a pixel having no black pixel around it (hereinafter referred to as "isolated pixel"). Note that since the pixels lying left upward, upward, right upward and left among the surrounding pixels have been known to be the white pixel by the repetition of the steps from S12 to S13 to S14 to S12, as above described, the discrimination of this isolated pixel is only necessary to perform for the remaining four pixels, as shown in FIG. 9.

Figure 10:
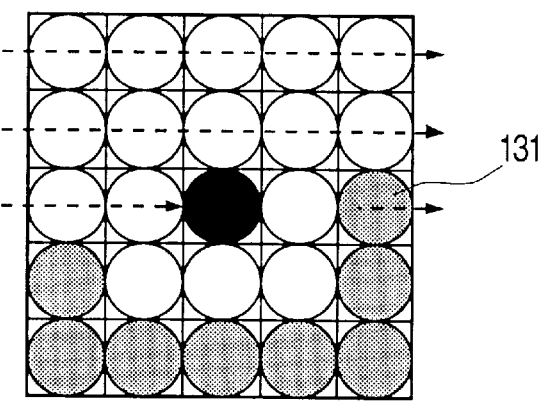
FIG. 10 is a view illustrating an isolated pixel.

When the pixel is isolated as illustrated in FIG. 10, the noticed black pixel is changed to the white pixel at step S19, and then the procedure returns to step S12, where the raster scan is started from an unsearched pixel two locations ahead (indicated by the number 131 in FIG. 10) on the same line as the noticed black pixel. That is, since the isolated pixel has been produced most possibly due to the noise and is not subject to the contour chasing, this isolated pixel is erased from the image data.

Figure 11:
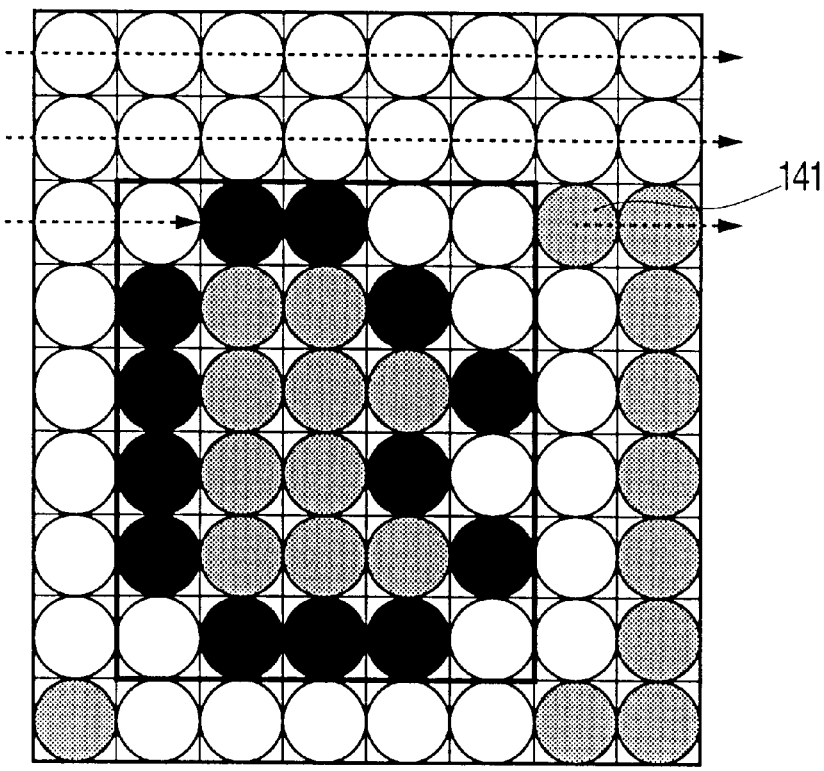
FIG. 11 is a view illustrating a black pixel block extracted by the contour chasing.
Figure 12:
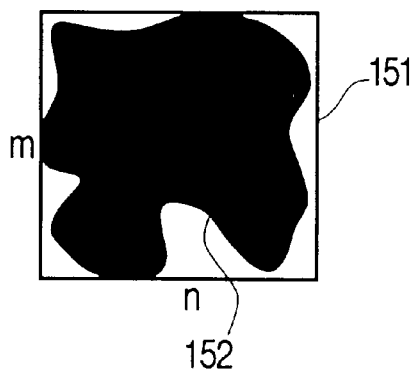
FIG. 12 is a view illustrating a black pixel block and a noise discriminating window.

Also, when the noticed black pixel is not the isolated pixel, the contour chasing is performed at step S17 to extract a black pixel block containing the noticed black block as shown in FIG. 11. Subsequently, at step S18, the extracted black pixel block is superimposed on a noise discrimination window which consists of m pixels in the longitudinal direction and n pixels in the transversal direction in accordance with m value and n value stored as the noise discrimination window size parameter in the RAM 4, and if the black pixel block 152 is totally contained within the noise discrimination window 151 as illustrated in FIG. 12, the black pixel block 152 is judged as the noise. At step S19, all the pixels of the black pixel block are changed to the white pixels, and the procedure returns to step S12 to start the scan from an unsearched pixel (indicated by the number 141 in FIG. 11) adjacent the black pixel block on the same line as the noticed black pixel. That is, the black pixel block judged as the noise is erased from the image data at step S19.

The size of this noise discrimination window having m pixels in the longitudinal direction and n pixels in the transversal direction can be determined by the ratio of the resolution of image data in the longitudinal direction to the resolution in the transversal direction. For example, when the resolution is image data of 200 dpi in the longitudinal direction and 400 dpi in the transversal direction, the noise discrimination window may be two pixels in the longitudinal direction and four pixels in the transversal direction, or three pixels in the longitudinal direction, and six pixels in the transversal direction. In this manner, the window size with the same ratio as that of the resolutions of image data and close to the predetermined size for the noise is determined, and stored as the parameter in the RAM 4. This determination of window size can be made in accordance with the resolution characteristic of image data when the image to be processed is input or when the image is processed.

If the extracted black pixel block extends outside the noise discrimination window 151, its block is judged as a part of the character or image, and the procedure returns to step S12 to start the scan from an unsearched pixel (indicated by the number 141 in FIG. 11) adjacent the black pixel block on the same line as the noticed black pixel.

If the scan for the whole image is terminated, the procedure proceeds from step S14 to step S20 to combine adjacent blocks having the same feature. At step S21, the attribute such as the character, icon or graphic is discriminated for each combined block.

The judgment to combine adjacent blocks at step S20 is made by taking notice of black pixel blocks in sequence from the upper left, examining respective distances of the noticed black pixel block to adjacent blocks located longitudinally and transversally of thereof, and determining the nearest block to be the combining direction with the block. Further, an additional combination condition that the ratio of the width of the noticed block relative to that of adjacent block determined as the combining direction (or the height if the direction is right) does not exceed a predetermined reference value is used.

The discrimination of the attribute at step S21 is made by comparing the size of black pixel block extracted at step S17 with a certain preset reference value, and discriminating the smaller block as the character and the larger block as other than the character. Further, the area having a number of blocks combined as judged at step S20 can be also judged as the character area. Also, regarding the table, the block having a cell and a greater ratio of white when the white and black ratio is obtained is determined as the table. Accordingly, the area having large block and other than table is determined as the graphic.

Note that the size of the noise discrimination window 151 is preset in accordance with the resolution of image data and the size to be judged as the block due to noise, but when there is much noise in the image data, the size can be adjusted based on the result of actual area discrimination.

Figure 13:
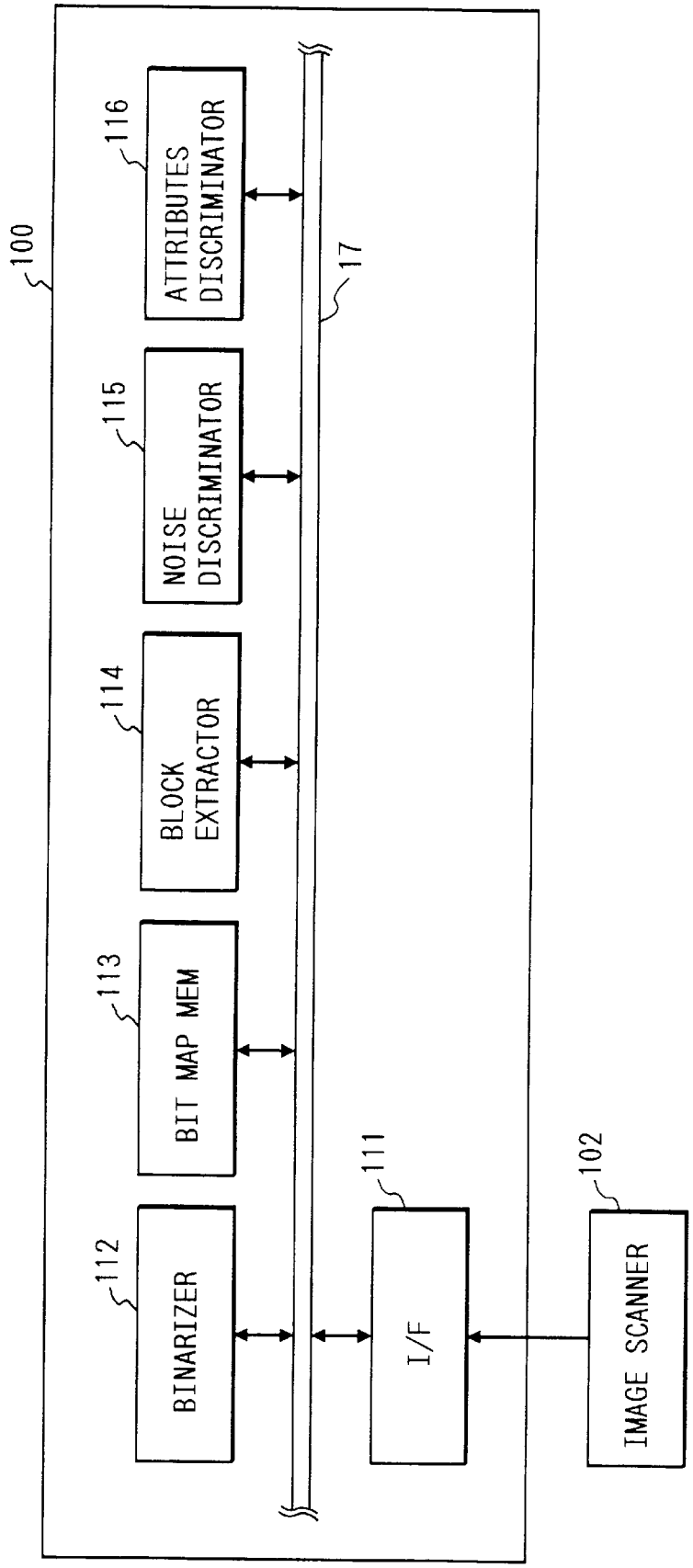
FIG. 13 is a block diagram showing a configurational example of an image processor in the example 2.

FIG. 13 is a block diagram showing a configurational example of an image processor in this example which executes the area discrimination process as shown in FIG. 8.

In FIG. 13, an image scanner 102 reads the original image and outputs multi-value image data subjected to a predetermined processing such as the shading.

The image data output from the image scanner 102 is input via an interface I/F 111 for the image processor 101 of this example, and is subjected to the pre-processing (corresponding to step S11 in FIG. 8) such as binarization in a binarizer 112. Note that the I/F 111 is a general-purpose interface such as SCSI, RS232C, RS422, or GPIB.

The binarizer 112 binarizes the green image data or RGB average value, or the brightness component obtained from the input image data, when the input image data is color image data such as RGB image data. It is noted that if the binary image data is input, the data is directly output.

The binary image data output from the binarizer 112 is stored in sequence in a bit map memory 113 comprised of RAM.

A block extractor 114 is one in which if the black pixel is detected by rester scanning the bit map memory 113, its surrounding pixels are investigated to determine whether or not the noticed black pixel is isolated, and if not isolated, the black pixel block is extracted through the contour chasing to output its area information. Also, if it is the isolated pixel, its position of the bit map memory 112 is changed to the white pixel data. That is, the block extractor 114 performs a part of the steps S12 to S17 and S19 in FIG. 8.

A noise discriminator 115 investigates the area information of a black pixel block which the block extractor 114 outputs to determine whether or not the block is entirely contained in the noise discrimination window, and if contained, changes its block of bit map memory 112 to the white pixel data. Also, when the block extends outside the noise discrimination window, it passes the area information to an attribute discriminator 116. Namely, the noise discriminator 115 performs a part of steps S18 and S19 in FIG. 8.

The area discriminator 116 combines adjacent blocks having the same feature stored in the bit map memory 113, based on the area information input from the noise discriminator 115, if the end of scan is notified from the block extractor 114, and discriminates the attribute such as the character, icon or graphic to output its discriminated result. Namely, the area discriminator 116 performs steps S20 and S21 in FIG. 8.

It should be noted that the above-cited blocks are interconnected via a bus 117 to exchange the image data or discriminated result. And the discriminated result of image area is also sent to another image processor via the bus 117. Also, the image data for which the image area is discriminated is not limited to that image data input from the image scanner 102, but can be entered via the bus 117 from another image processor or image storage, or from the facsimile apparatus via the I/F 111. Further, the image data transmitted via a computer network having a network interface from the personal computer can be entered.

Also, the image data with the noise removed at the time when the end of scan is judged at step S14 and the result of attribute determination at step S21 can be output via the input/output interface 6 by display means (CRT or LCD) or printing means.

Also, with the provision of a microcomputer, a ROM storing the software, and a RAM for the work memory thereof, the operation and function of the binarizer 112, the block extractor 114, the noise discriminator 115 and the attribute discriminator 116 can be realized.

While in the above description and drawings, the raster scan was performed from the upper left end of image data to the lower right end to retrieve the black pixel, it will be appreciated that the raster scan may be performed from the upper right end to the lower left end to retrieve the pixel, with identical information of black pixel block obtained through the contour chasing, and with the same result.

As above described, according to the present invention, the black pixel block due to noise is detected during the contour chasing, and erased from the image data, and only the blocks other than the black pixel block due to noise are passed to the block combination and attribute discriminating process that follows, thereby preventing the accuracy of area discrimination from decreasing due to noise. Further, the removal of the block due to noise results in decreased number of blocks which are subject to the area discrimination, thereby bringing about the effect of speeding up the area discriminating process.

It should be noted that the present invention may be applied to the system comprised of a plurality of equipments, or a single system consisting of one equipment.

Also, it should be understood that the present invention is applicable as well to the system or the apparatus which is supplied with the program.

What is claimed is:

1. An image processing method comprising the steps of:
   finding a next feature pixel by investigating pixels surrounding a current feature pixel lastly found in image data, in a predetermined order and without investigating pixels which have been already investigated;
   chasing said next feature pixel from said current feature pixel, wherein said finding step and chasing step are executed repeatedly;
   extracting an area surrounded by the feature pixels chased in said chasing step; and
   determining features of the extracted area.

2. An image processing method according to claim 1, wherein an initial feature pixel of said lastly found feature pixel is found by means of raster scan starting from one end of the image data.

3. An image processing method according to claim 2, wherein said investigating is started from a pixel adjacent to said initial feature pixel.

4. An image processing method according to claim 2, wherein another raster scan starts in the same direction as in an immediately preceding raster scan in order to detect a next initial feature pixel after completing said chasing.

5. An image processing method according to claim 1, wherein the contour of an area surrounded by second feature pixels, different from the feature pixels, is chased inside the area surrounded by the feature pixels.

6. An image processing method according to claim 5, wherein the contour of the area surrounded by the feature pixels and the contour of the area surrounded by the second feature pixels are alternately chased.

7. An image processing method according to claim 5, wherein the second feature pixels are background pixels.

8. An image processing method according to claim 1, wherein information of the area surrounded by the extracted feature pixels is displayed on display means.

9. An image processing method according to claim 1, wherein feature information of the extracted area is displayed on display means.

10. An image processing method according to claim 1, wherein information of the area surrounded by the extracted feature pixels is output by printing means.

11. An image processing method according to claim 1, wherein feature information of the extracted area is output by printing means.

12. An image processing method according to claim 1, wherein the image reading means is an image scanner.

13. An image processing method according to claim 1, wherein said investigating is started from a pixel adjacent to a pixel which has been already investigated.

14. An image processing method according to claim 1, wherein said predetermined order is counterclockwise order around the current feature pixel in said investigating in the case of chasing the contour counterclockwise.

15. An image processing method according to claim 1, wherein said predetermined order is clockwise order around the current feature pixel in said investigating in the case of chasing the contour clockwise.

16. An image processing apparatus including:
   finding means for finding a next feature pixel by investigating pixels surrounding a current feature pixel lastly found in image data, in a predetermined order and without investigating pixels which have been already investigated;
   image chasing means for chasing said next feature pixel from said current feature pixel, wherein said finding step and chasing step are executed repeatedly;
   extracting means for extracting an area surrounded by the feature pixels chased by said image chasing means; and
   determining means for determining features of the extracted area.

17. An image processing apparatus according to claim 16, wherein an initial feature pixel of said lastly found feature pixel is found by means of raster scan starting from one end of the image data.

18. An image processing apparatus according to claim 17, wherein said investigating is started from a pixel adjacent to said initial feature pixel.

19. An image processing apparatus according to claim 17, wherein another raster scan starts in the same direction as in an immediately preceding raster scan in order to detect a next initial feature pixel after said pixel chasing means completes said chasing.

20. An image processing apparatus according to claim 16, wherein said image chasing means chases the contour of an area surrounded by second feature pixels, different from said feature pixels, inside the area surrounded by said feature pixels.

21. An image processing apparatus according to claim 20, wherein said image chasing means alternately performs contour chasing of the area surrounded by said feature pixels and contour chasing of the area surrounded by said second feature pixels.

22. An image processing apparatus according to claim 20, wherein said second feature pixels are background pixels.

23. An image processing apparatus according to claim 16, wherein the information of an area surrounded by said extracted feature pixels is displayed on display means.

24. An image processing apparatus according to claim 16, wherein the feature information of said extracted area is displayed on display means.

25. An image processing apparatus according to claim 16, wherein the information of an area surrounded by said extracted feature pixels is output by printing means.

26. An image processing apparatus according to claim 16, wherein feature information of said extracted area is output by printing means.

27. An image processing apparatus according to claim 16, wherein said image data reading means is an image scanner.

28. An image processing apparatus according to claim 16, wherein said investigating is started from a pixel adjacent to a pixel which has been already investigated.

29. An Image processing apparatus according to claim 16, wherein said predetermined order is counterclockwise order around the current feature pixel in said investigating in the case of chasing the contour counterclockwise.

30. An image processing apparatus according to claim 16, wherein said predetermined order is clockwise order around the current feature pixel in said investigating in the case of chasing the contour clockwise.

31. A computer-usable medium storing computer-usable instructions for a program-controlled image processing apparatus, the instructions comprising instructions for:

causing the apparatus to find a next feature pixel by investigating pixels surrounding a current feature pixel lastly found in image data, in predetermined order and without investigating pixel which have been already investigated;

causing the apparatus to chase said next feature pixel from said current feature pixel, wherein said finding step and chasing step are executed repeatedly;

causing the apparatus to extract an area surrounded by the feature pixels chased in execution of said chasing instruction; and causing the apparatus to determine features of the extracted area.

32. A computer-usable medium according to claim 31, wherein an initial feature pixel of said lastly found feature pixel is found by means of raster scan starting from one end of the image data.

33. A computer-usable medium storing computer-usable instructions for a program-controlled image processing apparatus according to claim 32, wherein said investigating is started from a pixel adjacent to said initial feature pixel.

34. A computer-usable medium storing computer-usable instructions for a program-controlled image processing apparatus according to claim 32, wherein another raster scan starts in the same direction as previous raster scan in order to detect a next initial feature pixel after completing said chasing.

35. A computer-usable medium according to claim 31, wherein the contour of an area surrounded by second feature pixels, different from the feature pixels, is chased inside the area surrounded by the feature pixels.

36. A computer-usable medium according to claim 35, wherein the contour of the area surrounded by the feature pixels and the contour of the area surrounded by the second feature pixels are alternately chased.

37. A computer-usable medium according to claim 35, wherein the second feature pixels are background pixels.

38. A computer-usable medium according to claim 31, wherein information of the area surrounded by the extracted feature pixels is displayed on display means.

39. A computer-usable medium according to claim 31, wherein feature information of the extracted area is displayed on display means.

40. A computer-usable medium according to claim 31, wherein information of the area surrounded by the extracted feature pixels is output by printing means.

41. A computer-usable medium according to claim 31, wherein feature information of the extracted area is output by printing means.

42. A computer-usable medium according to claim 31, wherein the image reading means is an image scanner.

43. A computer-usable medium storing computer-usable instructions for a program-controlled image processing apparatus according to claim 31, wherein said investigating is started from a pixel adjacent to a pixel which has been already investigated.

44. A computer-usable medium storing computer-usable instructions for a program-controlled image processing apparatus according to claim 31, wherein said predetermined order is counterclockwise order around the current feature pixel in said investigating in the case of chasing the contour counterclockwise.

45. A computer-usable medium storing computer-usable instructions for a program-controlled image processing apparatus according to claim 31, wherein said predetermined order is clockwise order around the current feature pixel in said investigating in the case of chasing the contour clockwise.

* * * * *

UNITED STATES PATENT AND TRADEMARK OFFICE
CERTIFICATE OF CORRECTION

PATENT NO. : 6,356,657 B1
DATED : March 12, 2002
INVENTOR(S) : Makoto Takaoka et al.

It is certified that error appears in the above-identified patent and that said Letters Patent is hereby corrected as shown below:

Column 8,
Line 18, "of" should be deleted.
Line 62, "rester" should read -- raster --.

Column 11,
Line 42, "Image" should read -- image --.
Line 56, "pixel" should read -- pixels --.

Signed and Sealed this

Eighth Day of April, 2003

JAMES E. ROGAN
*Director of the United States Patent and Trademark Office*